(12) United States Patent
Lurvey

(10) Patent No.: US 8,328,991 B2
(45) Date of Patent: Dec. 11, 2012

(54) THERMAL CONVERSION OF ORGANIC MATTER INTO USABLE BY-PRODUCTS

(76) Inventor: Michael J. Lurvey, Waipahu, HI (US)

(*) Notice: Subject to any disclaimer, the term of this patent is extended or adjusted under 35 U.S.C. 154(b) by 736 days.

(21) Appl. No.: 12/508,083

(22) Filed: Jul. 23, 2009

(65) Prior Publication Data

US 2011/0017582 A1    Jan. 27, 2011

(51) Int. Cl.
*C10B 1/04* (2006.01)
*C10B 47/06* (2006.01)
*C10B 51/00* (2006.01)

(52) U.S. Cl. ............ 201/10; 201/38; 202/108; 202/266; 422/199

(58) Field of Classification Search .............. 201/10, 201/19, 36, 38; 202/99, 108, 109, 121, 266; 422/199
See application file for complete search history.

(56) References Cited

U.S. PATENT DOCUMENTS

| | | | |
|---|---|---|---|
| 783,307 A * | 2/1905 | Pittman | 202/108 |
| 1,375,943 A * | 4/1921 | Von Post | 202/109 |
| 1,461,108 A * | 7/1923 | Born | 202/84 |
| 1,589,746 A * | 6/1926 | Forssen | 202/108 |
| 1,710,070 A * | 4/1929 | Records | 202/215 |
| 2,687,950 A | 8/1954 | Kalfoach et al. | |
| 2,689,213 A * | 9/1954 | Records | 202/106 |
| 3,061,524 A | 10/1962 | Savage | |
| 3,503,867 A | 3/1970 | Ludlani et al. | |
| 4,435,374 A | 3/1984 | Helm, Jr. | |
| 6,808,543 B2 | 10/2004 | Paisley | |
| 2004/0178052 A1 | 9/2004 | Antal | |
| 2008/0216405 A1 | 9/2008 | Ichikawa et al. | |

* cited by examiner

*Primary Examiner* — Jill Warden
*Assistant Examiner* — Joye L Woodard
(74) *Attorney, Agent, or Firm* — Ladas & Parry, LLP

(57) ABSTRACT

A processing vessel is loaded with a feedstock including organic material and at least one additive which is non-inert to the organic material. A bottom portion of the feedstock is heated to a pyrolytic state for producing a horizontal thermal layer within the feedstock which thermally decomposes organic material into carbon as the non-inert additive reacts with the organic material. Vapor is directed downwardly through the feedstock while discharging volatile organic compounds from a lower portion of the chamber. Prior to complete thermal decomposition of the feedstock, the direction of vapor flow within the feedstock is reversed wherein the vapor flows upwardly through the feedstock while the volatile compounds are discharged from an upper portion of the chamber. Pressure and vapor flow within the chamber are regulated during upward vapor flow to regulate vertical movement of the thermal layer within the feedstock for controlling the extent of thermal decomposition of the feedstock.

11 Claims, 4 Drawing Sheets

THERMAL CONVERSION OF ORGANIC MATTER INTO USABLE BY-PRODUCTS

BACKGROUND

This disclosure relates to the conversion of renewable organic materials, i.e., carbon or hydrocarbon-based materials, into usable by-products such as charcoal, liquids, gases and energy.

Organic materials, such as municipal and animal solid waste, agricultural crops or wastes, wood, wood waste, straw, sugarcane and many other carbon or hydrocarbon based materials, often referred to as biomass, can be converted into useful by products, such as carbon products, clean synthetic fuels, chemicals or converted directly into steam, heat and power generation.

Systems have heretofore been disclosed which employ partial pyrolysis to thermally decompose organic materials into such useful by-products. Room for improvement of such partial-pyrolysis systems remains, especially with respect to their efficiency, flexibility and profitability.

SUMMARY OF THE DISCLOSURE

A process for thermally processing organic material comprises providing, in a processing vessel, a feedstock comprised of organic material and at least one additive which is non-inert to the organic material. A bottom portion of the feedstock is heated to a pyrolytic state for producing a horizontal thermal layer within the feedstock which thermally decomposes organic material into carbon as the non-inert additive reacts with the organic material to break down tars and paraffins into less complex hydrocarbon chains. Vapor is directed downwardly through the feedstock while discharging volatile organic gases from a lower portion of the chamber and out of the vessel as the feedstock is being thermally decomposed by the thermal layer. Prior to complete thermal decomposition of the feedstock, the direction of vapor flow within the feedstock is reversed wherein the vapor flows upwardly through the feedstock while the volatile gases are discharged from an upper portion of the chamber and out of the vessel. Pressure and vapor flow within the chamber are regulated during such upward vapor flow to regulate vertical movement of the thermal layer within the feedstock for controlling the extent of thermal decomposition of the feedstock. Following a prescribed extent of thermal decomposition of the feedstock, the process is terminated.

The apparatus in which the processing takes place comprises a vessel having a vertical outer sidewall, an openable top wall, a heating plate extending across a lower portion of the vessel, and a heating element disposed on an underside of the heating plate for heating the heating plate. A canister is removably disposed in the vessel and includes a processing chamber formed by a top wall, a vertical sidewall, and a permeable bottom wall for supporting organic material. The bottom wall is spaced above the heating plate to form a dispersion chamber therebetween. The sidewalls of the vessel and the canister, respectively, are arranged to form a double sidewall construction comprised of first and second side-by-side vertical passages encompassing the side of the compartment. The first passage communicates with an upper portion of the processing chamber and with a lower portion of the second passage. The second passage communicates with the outside of the vessel. The vessel includes valved passages for conducting vapor selectively into the dispersion space or the second passage while conducting volatile organic compounds from the vessel.

BRIEF DESCRIPTION OF THE DRAWING FIGURES

DETAILED DESCRIPTION OF A PREFERRED EMBODIMENT

Figure 1:
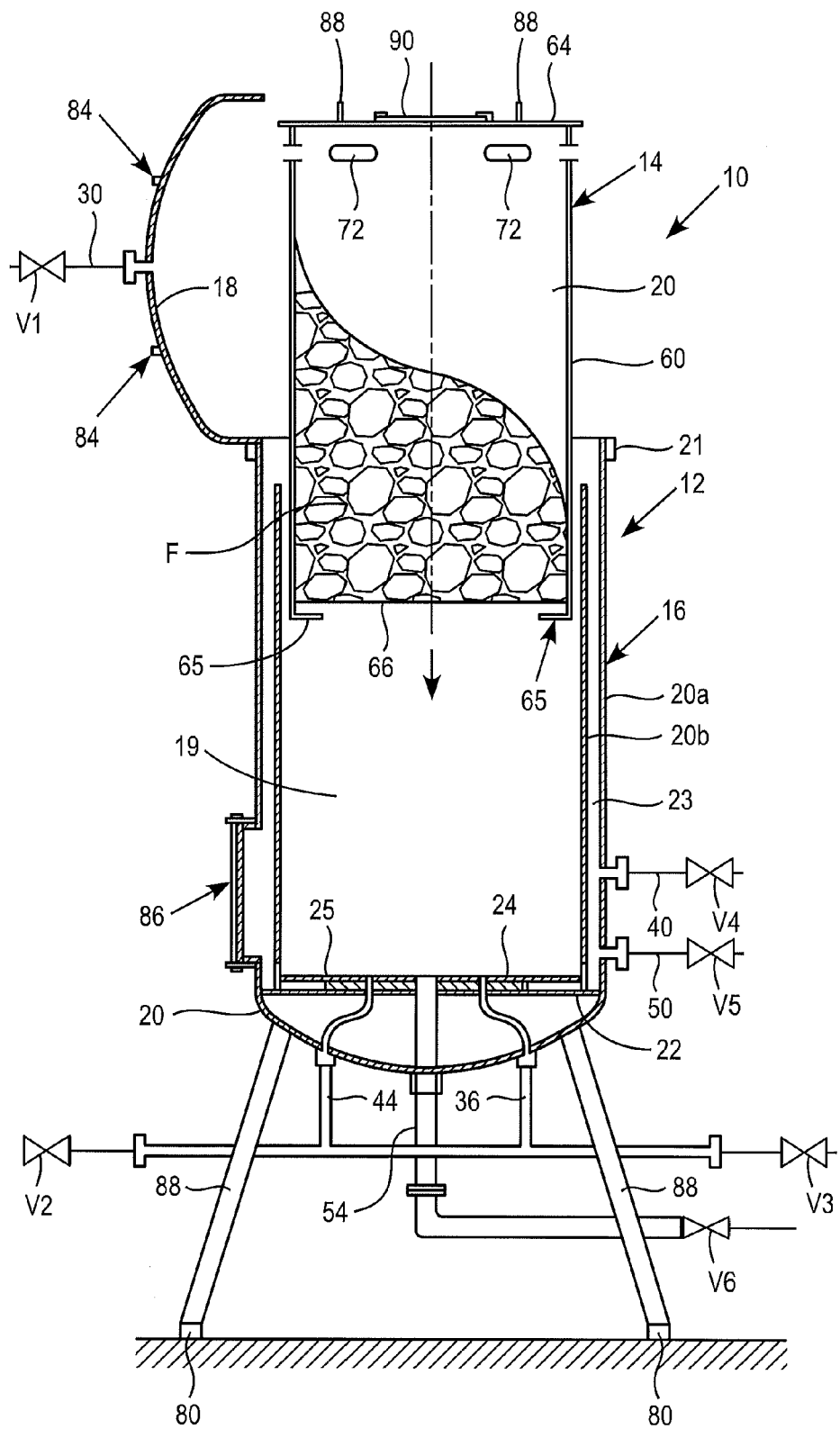
FIG. 1 is a schematic vertical sectional view through a processing apparatus showing a canister of the apparatus being inserted into a vessel of the apparatus.

A processor 10 comprises a vessel 12, and a canister 14 that can be inserted into, and removed from, the vessel 12. The vessel 12 includes a base portion 16 and a closable lid 18 capable of closing the interior of the vessel. The lid can be tightened by a conventional locking ring 17 to create a gas-tight seal for the vessel's interior.

The base portion has a double sidewall construction and a curved bottom wall 20. The double sidewall construction comprises a cylindrical outer sidewall portion 20a, which serves as the outer wall of the vessel, and a cylindrical inner sidewall portion 20b. Those sidewall portions 20a, 20b form therebetween a passage-defining gap 23. Extending horizontally across the vessel's interior at a location spaced above the bottom wall 20 is a heat reflector plate 22 above which a heating element, such as one or more electric heaters 24, is disposed. The heating element is bolted to the underside of a horizontal heating plate 25.

The flow of fluids, such as air and vapor, e.g., steam, into the vessel, and the flow of by-products such as gas and liquid from the vessel are controlled by a series of valved passages. Air can be conducted selectively through a passage 30 disposed in the lid, and a passage 34 which communicates with the vessel's interior through the reflector plate 22, the heating element 24 and the heating plate 25. Vapor, such as steam, can be conducted selectively through a passage 40 communicating with the passage 23 and extending through the outer sidewall portion 20a, and a passage 44 communicating with a lower portion of the vessel's interior through the reflector plate 22, the heating element 24, and the heating plate 25. Process fluids (i.e., gas and/or liquid) can be conducted from the vessel through a passage 50 communicating with the passage 23 and extending through the outer sidewall portion 20a, or a passage 54 communicating with the lower portion of the vessel through the reflector plate 22, the heating element 24 and the heating plate 25. Closure valves V1-V6, preferably electronically controlled, are provided at respective ones of the passages 30, 44, 36, 40, 50 and 54.

The canister 14 comprises a cylindrical sidewall 60, a top wall 64, and a bottom wall 66 forming therein a processing chamber 20. The bottom wall is gas/liquid permeable and, with the canister installed in the vessel, the bottom wall 66 is spaced above the heating plate 24 by legs 65 which project downwardly from a lower edge of the sidewall 60. There is thus formed a dispersion space 67 between the permeable wall 66 and the heating plate 25 in which air and/or vapor can be dispersed prior to flowing into the chamber via the passages 34, 44 in order to provide a more uniform distribution of the air/vapor. The sidewall 60 is of smaller diameter than the inner sidewall portion 20b of the vessel so that when the canister 14 is installed, a passage-defining gap 70 is formed between the sidewall 60 and the sidewall portion 20b. Thus, the vertical side of the chamber is encompassed by two vertical side-by-side passages 23, 70.

Figure 4:
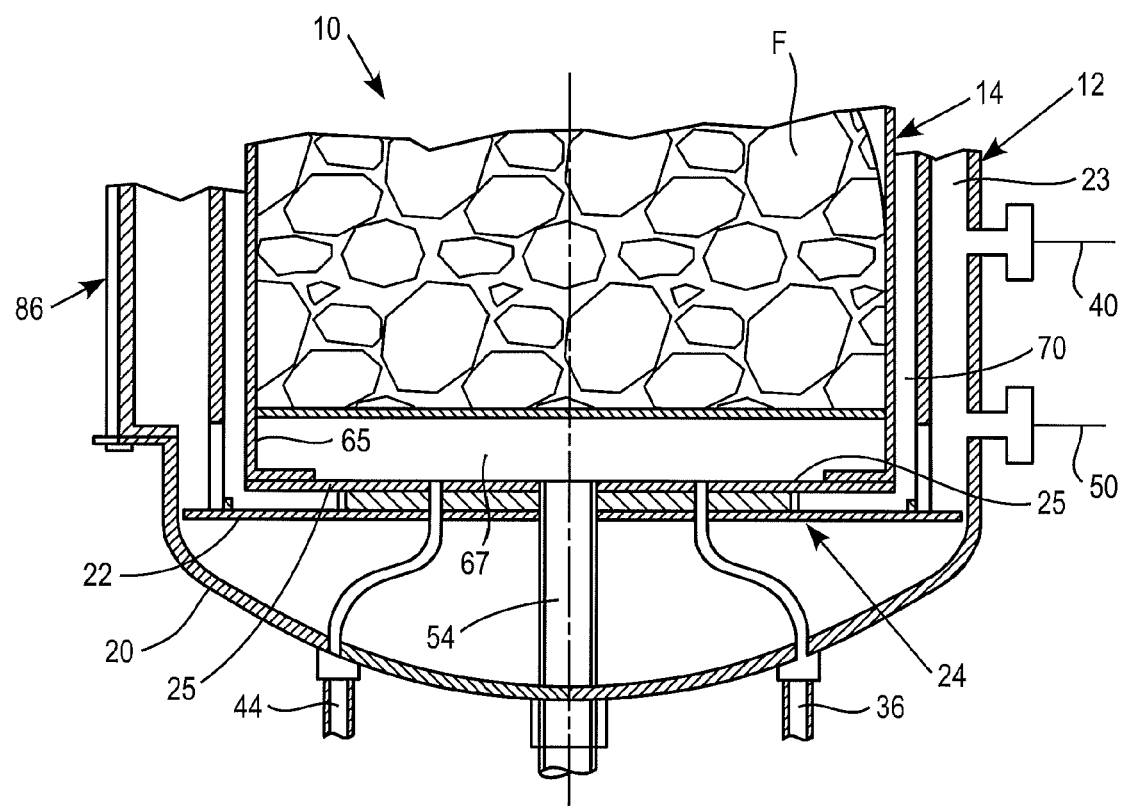
FIG. 4 is an enlarged fragmentary view of a lower portion of the vessel and canister after the canister has been inserted into the vessel.

Openings 72 are formed in the sidewall 60 near the upper end of the processing chamber 20 and are in communication with the upper end of the passage 70. The lower edge of the inner sidewall portion 20b has holes 75 spaced circumferentially around a lower edge thereof in order to communicate the passages 23 and 70 with one another (FIG. 4.). Accordingly, with the canister installed, the communicating passages 23, 70 communicate the upper end of the chamber 20 with the passages 30, 40 and 50.

The lid 18 includes rupture disks 84 which function to release pressure from the vessel if the pressure exceeds a certain predetermined pressure.

An access hatch 86 is provided near the bottom of the vessel to enable personnel to enter the vessel for cleaning or maintenance purposes.

The top of the canister 14 is provided with lifting rings 88 to receive cables enabling the canister to be raised or lowered.

The top wall 64 of the canister includes an openable hatch 90 to enable feedstock to be loaded and unloaded.

In practice, the process is carried out by loading the canister's chamber 20 with feedstock F comprised of organic material and at least one non-inert additive, i.e., an additive which will react with the organic material. The types of additives that are used depends upon the type of organic material being processed and may include iron filings (e.g., steel wool), gypsum (e.g., hydrated lime) and copper filings for example. The purpose of the additives is to react with the organic material and break down tars and paraffins into less complex hydrocarbon chains as the hydrogen oxygen bonds are broken and the hydrogen reacts with carbon. This is in contrast to conventional processes in which such additives are added to the fuel by-products which exit the processing vessel.

Figure 2:
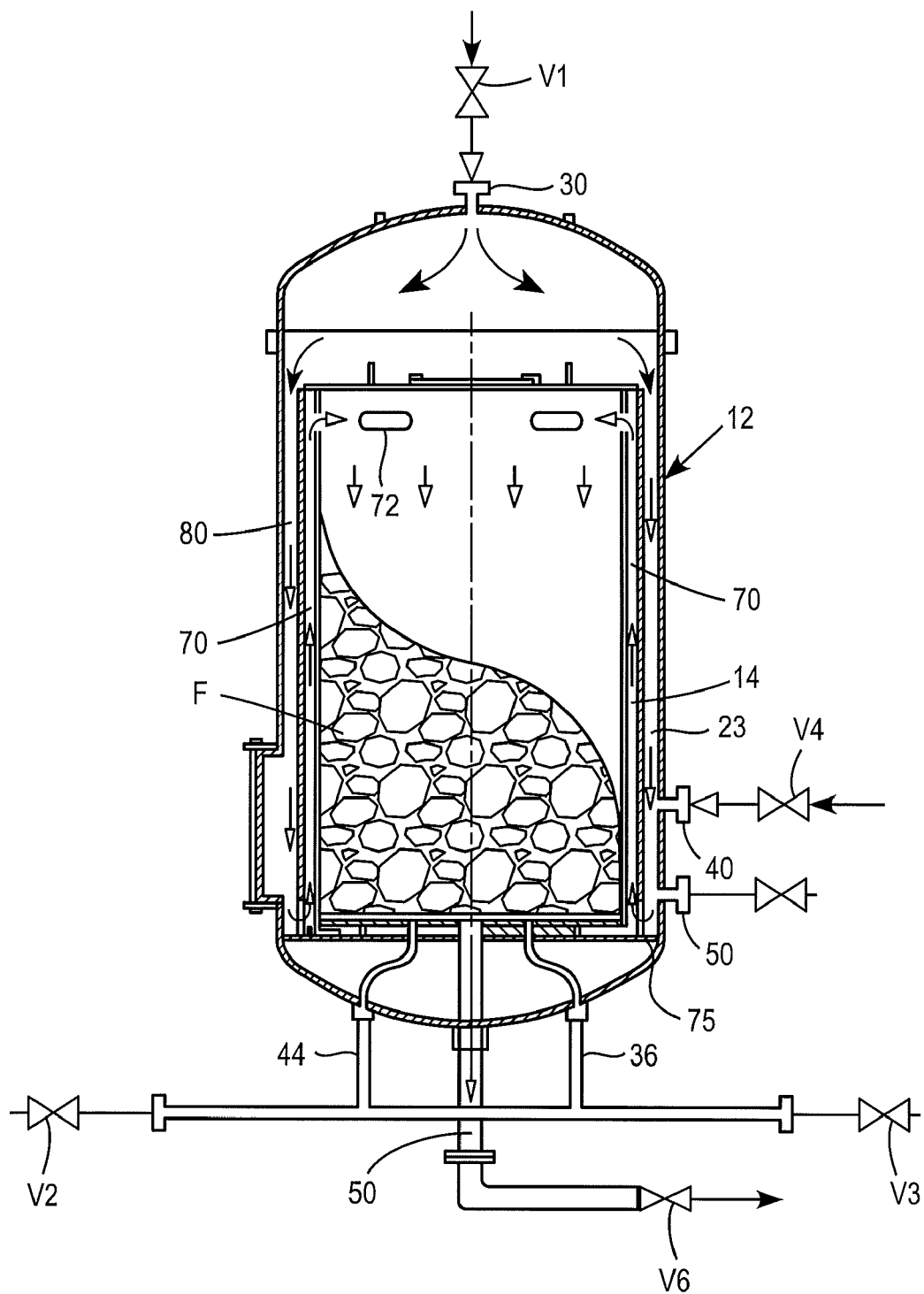
FIG. 2 is a view similar to claim 1 after the canister has been inserted into the vessel, showing one direction of internal fluid flow within the vessel.

The canister is then inserted into the vessel 12, such that the top wall 64 thereof comes to rest on the top edge of the inner wall portion 20b, to close the upper end of the passage 70, as shown in FIG. 2. Then, the vessel's lid 18 is closed but not sealed. The electric heating element 24 is then activated to heat the heating plate 25 and air is introduced through either or both of the passages 30, 36 until there occurs pyrolysis in the form of a thermal layer extending across the bottom of the feedstock. Such a thermal layer is typically about 6-8 inches and serves to thermally decompose the feedstock. As will be explained, the present process provides a way of regulating the rate and direction of movement of the thermal layer within the feedstock in order to maximize the production of by-products.

Once the thermal layer is formed, the vessel is sealed by tightening the locking ring 17. Pressure in the chamber is allowed to build-up until a predetermined pressure is reached, whereupon the air inflow is terminated. Volatile organic compounds (VOC's) begin to be released by the feedstock.

When the internal temperature, measured by heat sensors (not shown) disposed along the outer sidewall portion 20a of the vessel, reaches such a sufficiently high level that heat from the heating element is no longer needed to maintain the pyrolysis, the heating element is deactivated.

When gas pressure within the vessel, sensed by conventional pressure sensors (not shown,) reaches a sufficiently high level, the valve V6 is opened to discharge the internal gases, including the VOC's, from the vessel for further processing (see FIG. 2). Those gases (and possibly liquids) exit the lower end of the canister through the permeable bottom wall 66 and leave the vessel through the passage 50. Simultaneously, vapor is caused to flow downwardly through the feedstock.

By "vapor" is meant moisturized air and includes both air and water. It is intended that the vapor be introduced into the vessel in the form of steam or be converted to steam prior to reaching the feedstock. That is, vapor is introduced into the vessel via passage 40 and travels downwardly within the passage 23, then through the openings 75 and upwardly through the passage 70 and through the openings 72 formed in the upper portion of the canister. The moisture in the vapor becomes superheated as it passes upwardly along the passage 70 (the vapor is converted to steam). If desired, additional air could be supplied via the passage 30 if the air supplied with the vapor is considered insufficient for the processing operation. That vapor, and possibly separate air, are supplied periodically at a rate sufficient to maintain the desired pressure in chamber 20 as the air/superheated vapor passes downwardly through the feedstock. Care is taken not to introduce so much vapor that the thermal layer is quenched, or to introduce so much air that ignition occurs in the feedstock.

Figure 3:
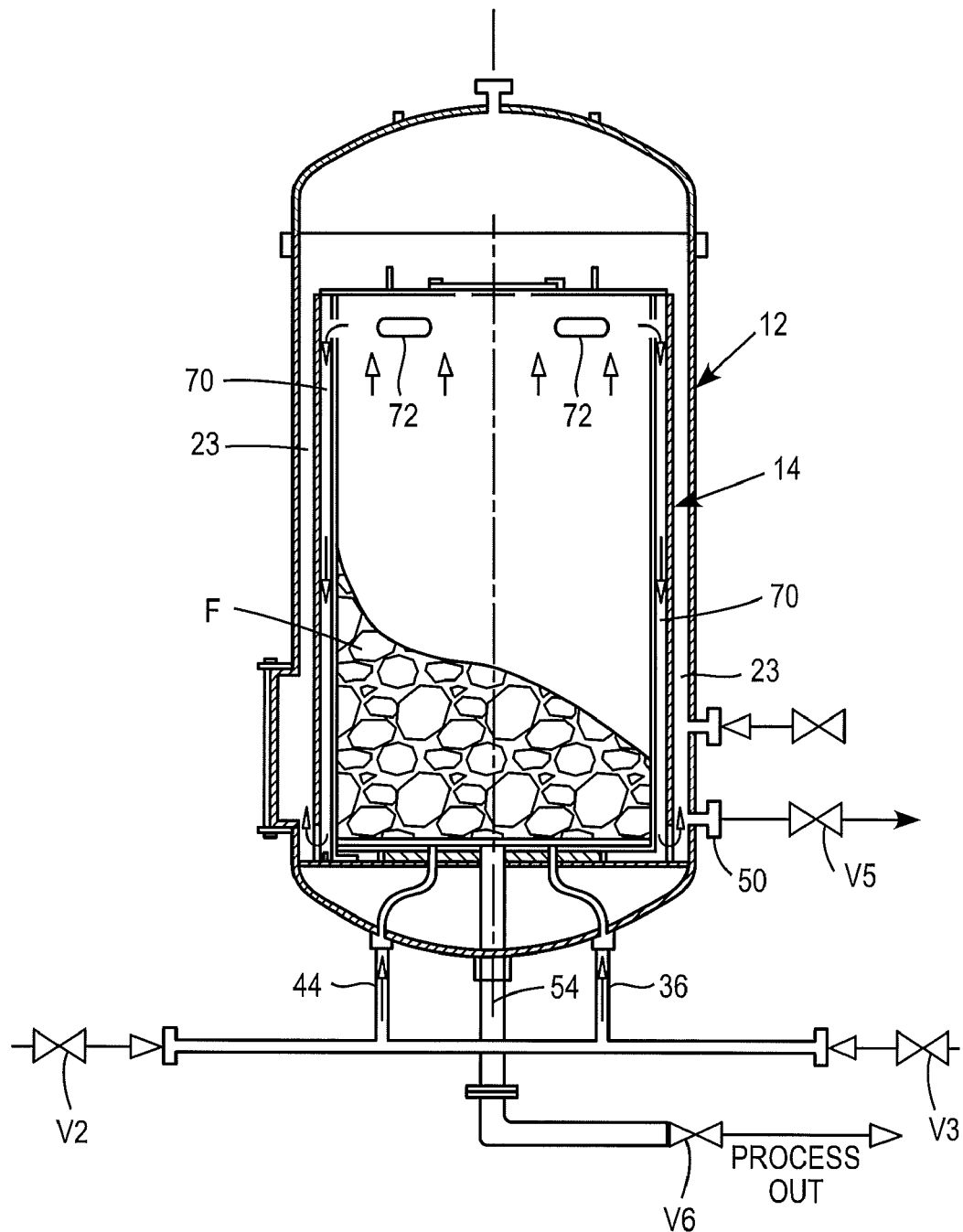
FIG. 3 is a view similar to claim 2, showing a reversal of the fluid flow.

Once the feedstock reaches a predetermined level of decomposition (e.g., 30% decomposition in some cases), the flow direction of the air/vapor through the feedstock is reversed, i.e., the downward flow thereof is converted to upward flow (see FIG. 3). That is achieved by closing the valves V1, V4 and V6 and periodically opening the valves V2 and V5. Consequently, vapor, and possibly additional air via the passage 36 if desired, is periodically introduced into the dispersion space 67 at the bottom of the canister, and VOC's (gas and/or liquids produced by condensing gases) are removed from the vessel through the passage 50, as shown in FIG. 3. The air and vapor entering the dispersion space 67 become dispersed so as to flow uniformly through the feedstock.

The afore-mentioned level of decomposition which triggers that flow reversal can be determined by measuring the weight of the canister and its contents. That is accomplished by providing conventional load cells 80 on the bottom of legs 88 of the vessel (see FIG. 1). Since the weight of the vessel 12, the weight of the canister 14 and the initial weight of the feedstock loaded into the canister are known, the signals from the load cells can be monitored to determine the current weight of the decomposing feedstock.

With the periodically incoming vapor and exiting gases flowing as shown in FIG. 3, the frequency of opening the valves V2, V5 and possibly V3 can be suitably regulated so that the incoming air and vapor flows are balanced with respect to the exiting gases, thereby allowing an exothermic reaction to continue within the processor. The rate of air and vapor flows can also be regulated along with regulation of the pressure of the chamber 20 (by releasing built-up pressure) in order to control the vertical travel of the thermal layer within the feedstock. That is, the thermal layer can be caused to rise or descend, as desired, in order to ensure that the thermal decomposition occurs throughout the entire height of the feedstock and maximize the production of VOC's and carbon. If the flow of air/vapor through the feedstock were not reversed from the downward flow to the upward flow, the feedstock would be unevenly decomposed (with little decomposition occurring at the middle and top of the feedstock) and excessive tars would be produced. Instead, the resulting carbon is relatively clean (tar-free). At the same time, it can be ensured that the feedstock is not completely converted to ash if the production of carbon is desired.

The extent to which the thermal decomposition occurs is dependent upon the by-products being produced. That is, if carbon is to be produced, the feedstock is not completely decomposed and, if activated charcoal is to be produced from the carbon, steam is injected upwardly via passage 46 and directly into the hot carbon to force cracking of the carbon and the release of remaining volatile organic compounds therefrom. If no carbon product is being produced, the feedstock is allowed to completely decompose (i.e., turn to ash).

Eventually, the reaction is terminated by inflowing excessive (quenching) vapor, and the processing chamber is depressurized by opening the valve V1, allowing the lid 18 to be opened and the canister 14 to be removed and replaced by a new feedstock-containing canister to enable a new batch of organic matter to be processed.

It will be appreciated that carbon can be recovered for reuse as a fuel. The gases and/or liquids that are discharged from the processor can be filtered and cleaned for reuse. The nature of those gases and/or liquids will depend upon the composition of the organic being treated.

It will be appreciated that in the process enabled by the apparatus, the feedstock is initially heated while air and vapor travel downwardly therethrough, thus preventing the lower part of the feedstock from being excessively decomposed. Thereafter, the flow of air and vapor is reversed so as to travel upwardly through the feedstock while regulating the amount of air and vapor flows and the chamber pressure so that the rate and direction of movement of the thermal layer through the feedstock can be controlled in order to maximize the amount of by-products produced. The double-wall construction of the vessel minimizes the loss of heat generated within the vessel to maximize the efficiency of the process.

What is claimed is:

1. A process for thermally processing organic material comprising the steps of:
    A. providing in a processing vessel, a chamber containing feedstock comprised of organic material and at least one additive which is non-inert to the organic material;
    B. heating a bottom portion of the chamber to heat the feedstock to a pyrolytic state for producing a horizontal thermal layer within the feedstock which thermally decomposes organic material into carbon as the non-inert additive reacts with the organic material to break down tars and paraffins into less complex hydrocarbon chains;
    C. directing vapor downwardly through the feedstock while discharging volatile organic gases from a lower portion of the chamber and out of the vessel as the feedstock is being thermally decomposed by the thermal layer;
    D. prior to complete thermal decomposition of the feedstock, reversing the direction of vapor flow within the feedstock, wherein the vapor flows upwardly through the feedstock while the volatile gases are discharged from an upper portion of the chamber and out of the vessel;
    E. controlling pressure and vapor flow within the chamber during step D to regulate vertical movement of the thermal layer within the feedstock for controlling the extent of thermal decomposition of the feedstock; and
    F. following a prescribed extent of thermal decomposition of the feedstock, terminating the process.

2. The process according to claim 1 wherein step A comprises activating a heating element disposed beneath a permeable plate on which the feedstock is situated.

3. The process according to claim 1 wherein the chamber is surrounded on its vertical side by a double sidewall construction defining two side-by-side vertical passages through which the vapor travels and is superheated prior to passing downwardly through the feedstock in step C.

4. The process according to claim 1 wherein prior to the termination of the process in step E, injecting steam upwardly into the feedstock to force cracking of carbon in the chamber.

5. The process according to claim 1 wherein the chamber if formed by a canister removably disposed in the vessel.

6. The process according to claim 1 wherein the vapor flowing downwardly and upwardly through the feedstock in steps C and D, respectively, is steam.

7. A process for thermally processing organic material comprising the steps of:
    A. providing a processing vessel having a vertical side wall, an openable top wall, a heating plate disposed at a bottom portion of the vessel, and a heating element disposed beneath the heating plate for heating the heating plate;
    B. positioning within the vessel a canister forming a processing chamber having a permeable bottom wall on which is disposed a feedstock comprised of organic material and at least one non-inert additive, wherein the permeable bottom wall is spaced above the heating plate to define a dispersion space therebetween;
    C. activating the heating element to heat the bottom of the feedstock to a pyrolytic state for creating a horizontal thermal layer within the feedstock which thermally decomposes organic material into carbon as the non-inert additive reacts with the organic material to break down tars and paraffins into less complex hydrocarbon chains; then
    D. sealing the chamber when the chamber reaches a predetermined temperature;
    E. passing vapor through side-by-side vertical passages formed by a double sidewall construction encompassing the feedstock wherein the vapor is superheated,
    F. passing the superheated vapor downwardly through the feedstock while discharging volatile organic compounds from a lower portion of the chamber and out of the vessel as the feedstock is being thermally decomposed by the thermal layer;
    G. prior to complete thermal decomposition of the feedstock, reversing the direction of vapor flow through the feedstock, wherein the vapor flows upwardly through the dispersion space and into the feedstock while the volatile gases are discharged from an upper portion of the chamber and out of the vessel;
    H. controlling pressure and vapor flow within the chamber during step G to regulate vertical movement of the thermal layer for controlling the extent of thermal decomposition of the feedstock;
    I. following a prescribed extent of thermal decomposition of the feedstock, terminating the process.

8. An apparatus for thermally processing organic material comprising:
    a vessel having a vertical outer sidewall, an openable top wall, a heating plate extending across a lower portion of the vessel, and a heating element disposed on an underside of the heating plate for heating the heating plate;
    a canister removably disposed in the vessel and including a processing chamber formed by a top wall, a vertical sidewall, and a permeable bottom wall for supporting organic material, the bottom wall spaced above the heating plate to form a dispersion chamber therebetween, wherein the sidewalls of the vessel and the canister, respectively, are arranged to form a double sidewall construction comprised of first and second side-by-side vertical passages encompassing the side of the chamber;

the first passage communicating with an upper portion of the processing chamber and with a lower portion of the second passage, the second passage communicating with the outside of the vessel; and the vessel including valved passages for conducting vapor selectively into the dispersion space or into the second passage while conducting volatile organic compounds from the vessel.

9. The apparatus according to claim 8 wherein at least one of the valved passages extends through the heating plate.

10. The apparatus according to claim 8 further including a reflector plate extending across the lower portion of the vessel beneath the heating element.

11. The apparatus according to claim 8 wherein the vessel includes legs with respective load cells disposed at lower ends thereof.

* * * * *